Feb. 23, 1937.　　　　V. KAUDERS　　　　2,071,839

DYNAMO-ELECTRIC MACHINE

Filed April 12, 1933

WITNESSES:
R. J. Fitzgerald
R R Lockwood

INVENTOR
Viliam Kauders.
BY
ATTORNEY

Patented Feb. 23, 1937

2,071,839

UNITED STATES PATENT OFFICE 2,071,839

DYNAMO-ELECTRIC MACHINE

Viliam Kauders, Prague, Czechoslovakia, assignor to Westinghouse Electric & Manufacturing Company, East Pittsburgh, Pa., a corporation of Pennsylvania Application April 12, 1933, Serial No. 665,723
In Czechoslovakia April 14, 1932

15 Claims.   (Cl. 171—229)

This invention relates, generally, to electrical apparatus and it has particular relation to dynamo electric machines used for supplying direct current for arc welding.

A dynamo-electric machine or generator which is inherently especially adaptable for supplying direct current for maintaining a welding arc is one in which a slight change in current output is accompanied by a relatively great change in the voltage applied to the arc in the operating range of the generator. A generator of the cross-field type is especially adaptable for providing the desired arc current and voltage characteristics which are especially favorable for satisfactorily maintaining the operation of a welding arc.

A generator of this type may provide the desired voltage and current characteristics through the use of a single set of field windings, and it is unnecessary to provide a differential series field winding as is customary in other types of generators that are used for this purpose. In addition, due to the inherent characteristics of a generator of the cross-field type, it is unnecessary to use an exciter-generator for magnetizing the field structure. Due to the fact that no exciter-generator is used, the losses of the generator operating at no load or light loads are materially smaller than the losses which are obtained in generators of other types.

In view of the fact that only a single set of field windings is used, the transformer action which results when a multiplicity of field windings is used on current change in the welding circuit, is eliminated. For this reason, it is unnecessary to provide the customary transformer-reactor in the welding circuit in order to compensate for the transformer voltage which is induced in the main field winding on change of welding current through the ordinary series field windings.

A generator of the cross-field type inherently provides what is known as a steep voltage-current characteristic throughout the entire range of its operation. As will be readily understood, this character of operation is especially desirable for the maintaining of a proper welding arc so that the desired welding characteristics may be obtained in the arc by means of which the welding operation is being performed. A generator of this type also provides for a wide range of current adjustment which is especially desirable in order to permit the use of a single generator for a wide variety of types of work requiring, in certain instances, relatively small currents, in certain other instances, especially large currents, and for other applications, currents intermediate these values.

In order to regulate the current flow of a generator of the cross-field type, various systems have been proposed. In any current regulating system, it is desirable that the maximum efficiency of the generator may be maintained under all operating conditions, and, at the same time, it is also desirable to provide means for regulating the current which shall be relatively simple to operate and economical to construct. Various systems have been provide for regulating the current output of a generator of the cross-field type but all of these systems have been subject to one or more limitations, which make them undesirable for general application.

One of the systems that has been proposed for regulating the current flow comprises the use of a movable part of one or more of the pole pieces, so that magnetic saturation of the field structure may be varied to obtain different values of current output. This system involves the use of the means for varying the cross-sectional area of the magnetic circuit which area is reduced to a minimum in order to obtain low current values, and which is adjusted to the position of maximum cross-sectional area in order to obtain the maximum current output. Due to the reduction in the cross-sectional area in order to obtain low current values, the voltage which it is possible to obtain at the low current values is also reduced. This is undesirable since it is not possible to obtain desirable welding characteristics at low current values unless provision is made for increasing the no-load voltage. In addition, it is mechanically difficult to provide for regulating the cross-sectional area of the magnetic circuit, since it involves the use of pole pieces having movable parts or their equivalent. In addition, this system is also quite liable to become very noisy in operation and as a result, annoying to operators in its vicinity.

Another system that has been provided for regulating the current output of a cross-field generator comprises the provision of taps on the series field winding. The taps are brought out of the generator to a suitable switch in the form of the face plate of a rheostat, so that different numbers of turns on the series field windings may be made effective as desired. This system, however, involves considerable expense since the circuit connections between the turns of the series field winding and the switching device must be capable of carrying the total current output of the generator. The construction of this type of regulating means is also very expensive because of the large conductors which are involved. It is also uneconomical to use this type of regulation for the reason that, for low currents, only a fractional part of the turns of the series field winding is used, while the remaining turns are not used, except for the heavier currents.

Still another system that has been proposed is the use of a variable resistor or rheostat connected in shunt circuit relation with the series field winding. By increasing or decreasing the amount of resistance connected in parallel circuit relation with the series field windings, it is possible to vary the current flowing through the series field windings, as will be readily understood, and thereby it is possible to obtain current regulation. In order to obtain a wide range of current regulation by this system, it is necessary to provide a relatively large amount of current carrying capacity in the resistor, since the main welding current traverses this resistor. This system of regulation also has the disadvantage that, for relatively low current values, the voltage obtainable is also low and, as a result, desirable welding characteristics of the arc current and voltage are not readily obtainable without providing for a relatively high no-load voltage.

However, a more serious objection to the use of the variable resistor or rheostat in shunt circuit relation with the series field windings is found when its effect during the transient period is considered when the current and voltage of the generator are changing. Due to the fact that the resistor used for regulating the current flow through the series field windings is essentially non-inductive, practically all of the current change during the transient period takes place in the resistor and very little current change occurs in the series field windings.

This phenomenon will be readily understood by those skilled in the art when it is considered that current change in a circuit comprising an inductor and a resistor connected in parallel takes place more rapidly in the resistor branch containing the resistance, although ultimately the current flow through the two branches will be inversely proportional to their ohmic resistances after the transient period is over.

Because of the relatively small change in current flow through the series field windings, especially at short circuit, the change in the flux developed by the series field windings is not sufficient to overcome the armature reaction opposing this flux and, as a result, the polarity of the residual magnetism is reversed, with the result that the polarity of the welding generator is reversed. As is well known, this reversal in polarity is highly undesirable, since for ordinary welding operations, it is essential that the work on which welding operation is being performed be maintained at the positive potential.

In order to insure that the current in the series field windings will change with sufficient rapidity to prevent this change in polarity, an inductive shunt may be used to obtain the desired current variation. However, the use of an inductive shunt involves an additional expense which renders its use uneconomical in view of the fact that a relatively large inductive shunt must be used in order to balance the inductive characteristics of the series field windings.

In view of the foregoing, it is, therefore, an object of the invention to provide a dynamo-electric machine or generator of the cross-field type which shall be simple and efficient in operation and which may be readily and economically manufactured and used.

The principal object of the invention is to provide for regulating the current flow from a generator of the cross-field type.

Still another object of the invention is to provide for regulating the current output of a generator of the cross-field type over a wider range than would be possible if a symmetrical construction thereof were employed.

A further object of the invention is to provide for regulating the current output of a generator of the cross-field type having a plurality of pairs of poles.

Other objects of the invention will, in part, be obvious and, in part, appear hereinafter.

The invention accordingly is disclosed in the embodiment hereof shown in the accompanying drawing and comprises the features of construction, combination of elements and arrangement of parts which will be exemplified in the construction hereinafter set forth and the scope of the application of which will be indicated in the appended claims.

For a more complete understanding of the nature and scope of the invention, reference may be had to the following detailed description, taken in connection with the accompanying drawing in which.

Figure 1:
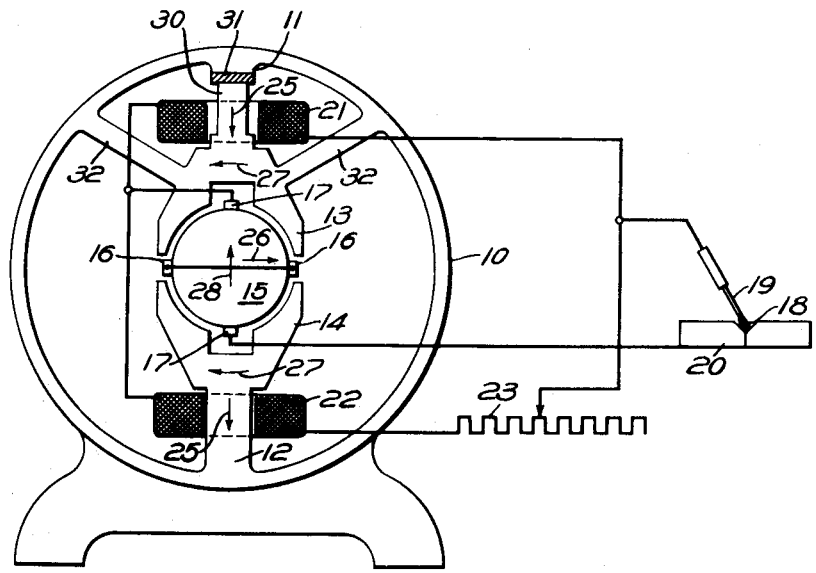
Figure 1 is a diagrammatic view of one embodiment of the invention.

Referring now particularly to Fig. 1 of the drawing, the reference character 10 designates generally the main frame of a generator of the cross-field type having pole pieces 11 and 12, which are arranged to carry pole shoes 13 and 14, respectively. As is readily understood, the only flux that is carried by the frame 10 is the exciting flux. The cross-sectional area of the magnetic circuit of the frame 10 may be relatively small, while the pole shoes 13 and 14 are constructed having a relatively large magnetic circuit, since the main flux for generating the welding current passes through them.

An armature 15 is mounted between the pole shoes 13 and 14 and is provided with auxiliary brushes 16—16 which are short circuited. The armature is also provided with main brushes 17—17 which are disposed directly underneath the pole shoes 13 and 14 and in a plane at right angles to the plane in which the auxiliary brushes 16—16 are disposed. The armature is connected, as illustrated, for maintaining an arc 18 between a welding electrode 19 and work 20 on which a welding operation is to be performed, as will be readily understood.

In order to provide for regulating the amount of current which is generated for maintaining the welding arc 18, series field windings 21 and 22 are disposed on the pole pieces 11 and 12, respectively. The series field windings 21 and 22 are connected in parallel circuit relation, as illustrated, between the upper main brush 17 and the welding electrode 19, and a variable resistor or rheostat 23 is connected in series circuit relation with the series field winding 22.

In operation, it will be readily understood that sufficient residual magnetism is retained in the pole shoes 13 and 14 so that a sufficient flux is provided for generating current through the short-circuited auxiliary brushes 16—16. When the welding electrode 19 is brought into contact engagement with the work 20, sufficient current flows through the series field windings 21 and 22, so that the effects of the residual magnetism are increased and a field flux is generated, as indicated by the arrows 25—25. The flux represented by the arrows 25—25 will be termed the exciting flux which is necessarily relatively small since it is employed only in the generation of current in the circuit including the short-circuited auxiliary brushes 16, the resistance of which path is small, as will be readily understood, so that a relatively small flux at a given speed of the armature 15 will produce a relatively large current flow.

Due to the flow of current in the conductors connected to the auxiliary brushes 16—16, a flux will be developed in the armature which may be represented by the arrow 26 which corresponds to the armature reaction flux of a direct current generator of the ordinary type and which traverses the pole shoes 13 and 14 in the direction indicated by the arrows 27—27. It is this flux which is relatively great that is cut by the conductors of the armature 15 to produce the operating voltage between the main brushes 17—17 and for this reason the pole shoes 13 and 14 are constructed having a large cross-sectional area to accommodate this large flux.

Due to the current flow in the conductors connected to the brushes 17—17, a flux is developed which may be represented by the arrow 28 which is directly opposed to the flux represented by the arrows 25—25 and which is a function of the current output of the armature 15. Because of the fact that the flux represented by the arrows 25—25 is limited by the magnetic saturation of the frame 10 while the flux represented by the arrow 28 is not so limited, the desired differential characteristic of the current with respect to the voltage is obtained, as will be readily understood.

When it is desired to operate the generator at the minimum current rating, the circuit through the variable resistor or rheostat 23 is opened, thereby permitting current to flow only through the series field winding 21. The maximum current output of the generator is obtained by cutting out all of the steps in the variable resistor 23 so that the series field windings 21 and 22 are connected directly in series circuit relation with the welding circuit and the series field winding is not connected in series circuit relation with any external resistance. It will be readily apparent that if the pole pieces 11 and 12 are symmetrical, the minimum current obtainable will be limited because of the fact that no regulation is provided for the series field winding 21.

In order to further broaden the range of regulation of the generator, the pole piece 11 may be provided with a reduced section 30, or with an air gap which is provided by means of a shim 31 of non-magnetic material such as brass, in order to reduce the effective field flux generated by the current flowing through the series field winding 21. In addition, magnetic shunts 32—32 may be provided around the series field winding 21 in order to provide the same effect. It will be readily understood that any of the three means may be provided for reducing the effective flux of the pole piece 11, or that they all may be used in combination, either, together or in part.

In the design of the generator, therefore, the minimum current rating is determined when the circuit to the series field winding 22 is opened and current is permitted to flow only through the series field winding 21. Regulation is then obtained by permitting current to flow through the series field winding 22 by adjusting the variable resistor 23, as desired, in order to vary the amount of excitation flux as represented by the arrows 25—25. As set forth hereinbefore, the maximum current may be obtained when all of the steps in the variable resistor 23 are cut out and maximum current is permitted to flow through the series field winding 22. Despite the fact that the pole piece 11 is saturated by relatively small currents flowing through the series field winding 21 or the effective flux flowing therethrough is reduced, sufficient leakage paths are provided to permit flux from the pole piece 12 to enter the armature 15 so that the necessary flux is provided for obtaining the higher current values.

Under operating conditions the following current values have been obtained for different adjustments of the variable resistor 23. These positions will be indicated in terms of current flow in amperes through the series field winding 22 rather than in terms of ohms of resistance.

| Current in winding 22 | Current in winding 21 |
| --- | --- |
| 0 | 37.5 |
| 12 | 88 |
| 24 | 126 |
| 54 | 152 |

The above current values represent the current flow through the series field windings when the generator is operating under steady state conditions and the transient period is over.

The ampere turns of the armature 15 which serve to produce the flux represented by the arrow 28 are arranged to be less than the ampere turns of the series field windings 21 and 22 which serve to produce the flux produced by the arrows 25—25. Since the same current flows through the conductors of the armature 15 and through the series field windings 21 and 22 which produces these fluxes, there is no opportunity for the flux represented by the arrow 28 to become larger than the flux represented by the arrows 25—25 and, therefore, it is not possible to reverse the polarity of the generator when the field connections according to this invention are used and the leakage flux distribution is such that the flux represented by the arrow 28 is never great enough to overcome the flux represented by the arrows 25. This result is obtained because, under transient conditions, while the current through the series field winding 22 increases at a much faster rate than the current through the series field winding 21, because of the series resistor 23, this current change is effective to change the exciting flux represented by the arrows 25—25, and as a result, this flux is always maintained greater than the flux represented by the arrow 28.

Figure 2:
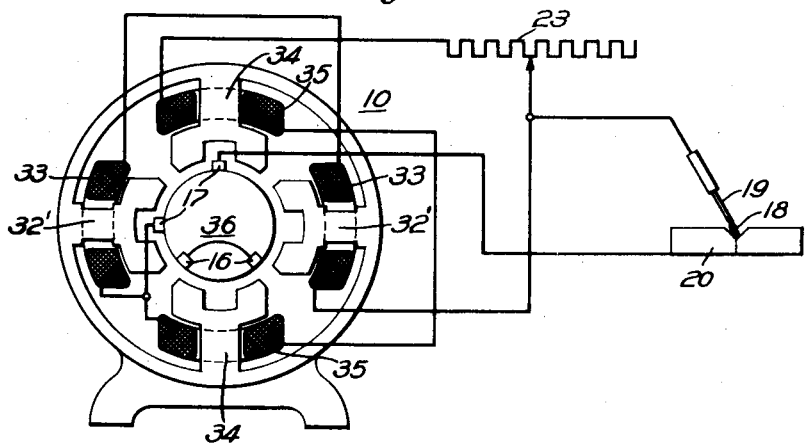
Fig. 2 is a diagrammatic view of a modification of the invention.

In certain instances, it may be desirable to provide more than two poles on the generator, and for this reason, the circuit illustrated in Fig. 2 of the drawing is provided. As illustrated, two pairs of poles are used, the pole pieces 32'—32' being provided with windings 33—33 which are connected directly in series circuit relation with the welding circuit, and the pole pieces 34—34 which are provided with windings 35—35 connected in series circuit relation with the welding circuit through the variable resistor 23. As illustrated, the pole pieces 32'—32' may be provided with portions of reduced cross-sectional area in order to obtain the desired operating characteristics at the lower range of current values as set forth hereinbefore. An armature 36 is positioned, between the pole pieces 32' and 34 in the customary manner, and in this instance, it may be wound for four poles in place of two poles, as is the armature 15 illustrated in Fig. 1.

It will be readily understood that the various other means for obtaining early saturation of the pole pieces 32'—32' may be provided, as illustrated and described hereinbefore.

Where in the claims the invention is described as a "dynamo-electric machine of the cross-field type", it is intended that this expression refers to a generator having short circuited brushes on its armature which connection serves to generate in the armature the main field flux.

Since certain further changes may be made in the above construction and different embodiments of the invention may be made without departing from the scope thereof, it is intended that all matter contained in the above description or shown in the accompanying drawing shall be interpreted as illustrative and not in a limiting sense.

I claim as my invention:

1. A dynamo-electric machine of the cross-field type comprising, in combination, a field structure, a pair of oppositely disposed and inwardly projecting pole pieces carried by the field structure, an armature disposed between the pole pieces, a field winding individual to each pole piece, the field windings being connected in parallel circuit relation to each other and in series circuit relation to the armature, and a rheostat connected in series circuit relation with one of the field windings for regulating the flow of current therethrough.

2. A dynamo-electric machine comprising, in combination, a field structure, a pair of oppositely disposed and inwardly projecting pole pieces carried by the field structure, one of the pole pieces being provided with a portion of smaller cross-sectional area than the other pole piece, an armature disposed between the pole pieces, a field winding individual to each pole piece, the field windings being connected in parallel circuit relation to each other and in series circuit relation to the armature, and a rheostat connected in series circuit relation with one of the field windings for regulating the flow of current therethrough.

3. A dynamo-electric machine comprising, in combination, a field structure, a pair of oppositely disposed and inwardly projecting pole pieces carried by the field structure, one of the pole pieces being provided with an air gap, an armature disposed between the pole pieces, a field winding individual to each pole piece, the field windings being connected in parallel circuit relation to each other and in series circuit relation to the armature, and a rheostat connected in series circuit relation with one of the field windings for regulating the flow of current therethrough.

4. A dynamo-electric machine comprising, in combination, a field structure, a pair of oppositely disposed and inwardly projecting pole pieces carried by the field structure, an armature disposed between the pole pieces, a field winding individual to each pole piece, the field windings being connected in parallel circuit relation to each other and in series circuit relation to the armature, magnetic shunting means disposed around one of the field windings and between the pole piece individual thereto and the field structure, and a rheostat connected in series circuit relation with one of the field windings for regulating the flow of current therethrough.

5. A dynamo-electric machine comprising, in combination, a field structure, a pair of oppositely disposed and inwardly projecting pole pieces carried by the field structure, one of the pole pieces being provided with a portion of smaller cross-sectional area than the other pole piece, an armature disposed between the pole pieces, a field winding individual to each pole piece, the field windings being connected in parallel circuit relation to each other and in series circuit relation to the armature, and a rheostat connected in series circuit relation with the field winding on the pole piece having the larger cross-sectional area for regulating the flow of current therethrough.

6. A dynamo-electric machine comprising, in combination, a field structure, a pair of oppositely disposed and inwardly projecting pole pieces carried by the field structure, one of said pole pieces being constructed to more readily permit the saturation thereof than the other of said pole pieces, an armature disposed between the pole pieces, a field winding individual to each pole piece, the field windings being connected in parallel circuit relation to each other and in series circuit relation to the armature, and a rheostat connected in series circuit relation with one of the field windings for regulating the flow of current therethrough.

7. A dynamo-electric machine comprising in combination, a field structure, a pair of oppositely disposed and inwardly projecting pole pieces carried by the field structure, one of said pole pieces being constructed to more readily permit the saturation thereof than the other of said pole pieces, an armature disposed between the pole pieces, a field winding individual to each pole piece, the field windings being connected in parallel circuit relation to each other and in series circuit relation to the armature, and a rheostat connected in series circuit relation with the field winding on the less readily saturable pole piece for regulating the flow of current therethrough.

8. In a dynamo-electric machine of the cross-field type, in combination, a field structure, a pair of oppositely disposed and inwardly projecting pole pieces carried by the frame, one of said pole pieces being more readily saturable than the other pole piece, a field winding individual to each pole piece, circuit means connecting the field windings to a current source, and regulating means for varying the flow of current through the field winding on the less saturable pole piece to vary the flux generated therein.

9. In a dynamo-electric machine of the cross-field type, in combination, a field structure, a pair of oppositely disposed and inwardly projecting pole pieces carried by the frame, one of said pole pieces being more readily saturable than the other pole piece, a field winding individual to each pole piece, circuit means connecting the field windings to a current source, and a variable resistor connected in series circuit relation with the field winding on the less saturable pole piece to vary the flux generated therein.

10. A dynamo-electric machine of the cross-field type comprising, in combination, a field structure, a pair of oppositely disposed and inwardly projecting pole pieces carried by the field structure, one of said pole pieces being constructed to more readily permit the saturation thereof than the other of said pole pieces, an armature disposed between the pole pieces, a first field winding disposed on the more readily saturable pole piece, a second field winding disposed on the less readily saturable pole piece, the field windings being connected in parallel circuit relation to each other and in series circuit relation to the armature, and a variable resistor connected in series circuit relation with the second field winding to permit the variation of the exciting flux applied to the armature and thereby varying the current output of the armature.

11. A dynamo-electric machine of the cross-field type comprising, in combination, a field structure, a plurality of pairs of oppositely disposed and inwardly projecting pole pieces carried by the field structure, one pair of said pole pieces being constructed to more readily permit the saturation thereof than the other pair of said pole pieces, an armature disposed between the pole pieces, a first pair of field windings, each individual to one of the more readily saturable pole pieces and connected in series circuit relation, a second pair of field windings individual to the less readily saturable pole pieces and connected in series circuit relation, said pairs of field windings being connected in parallel circuit relation and in series circuit relation to the armature, and a variable resistor connected in series circuit relation to the second pair of field windings for regulating the flow of current therethrough.

12. In a dynamo-electric machine of the cross-field type comprising, in combination, a field structure having a pair of pole pieces, an armature disposed between the pole pieces, a field winding on each of said pole pieces, said field windings being connected in parallel circuit relation with respect to one another and in series circuit relation with the armature, and means operable to vary the ratio of the currents flowing in said parallel connected field windings to control the current output of the machine.

13. In a dynamo-electric machine of the cross-field type, in combination, an armature, a field structure having a pair of pole pieces, one of said pole pieces being constructed to more readily permit the saturation thereof than the other of said pole pieces, a field winding individual to each pole piece, said field windings being connected in parallel circuit relation to each other and in series circuit relation to the armature, and means operable to vary the ratio of the currents flowing in said field windings to vary the current output of the machine.

14. In a dynamo-electric machine of the cross-field type comprising, in combination, an armature, a field structure having a pair of pole pieces, a field winding on each pole piece, said field windings being connected in parallel circuit relation and in series with the armature and variable impedance means connected in the armature circuit for varying the ratio of the currents flowing in said parallel-connected field coils and operable to disconnect one of said field windings from the armature circuit.

15. In a dynamo-electric machine of the cross-field type comprising, in combination, a field structure, a plurality of pairs of inwardly projecting pole pieces carried by the field structure, an armature disposed between the pole pieces, a field winding individual to each pole piece, the field windings on oppositely related pole pieces being connected in series circuit relation and the series connected groups being connected in parallel circuit relation with respect to one another and in series with the armature, and means operable to vary the ratio of the currents flowing through the parallel connected groups of field windings to control the current output of the machine.

VILIAM KAUDERS.